(12) United States Patent
Vaerewyck et al.

(10) Patent No.: US 7,141,118 B2
(45) Date of Patent: Nov. 28, 2006

(54) APPARATUS AND METHOD FOR TREATING AND IMPREGNATING POROUS STRUCTURES

(75) Inventors: Gerard J. Vaerewyck, Tarentum, PA (US); Edward A. Vitunac, Pittsburgh, PA (US); Anthony F. Fiasco, McKeesport, PA (US)

(73) Assignee: Patent Tech, LLC, Peabody, MA (US)

( * ) Notice: Subject to any disclaimer, the term of this patent is extended or adjusted under 35 U.S.C. 154(b) by 141 days.

(21) Appl. No.: 10/465,224

(22) Filed: Jun. 20, 2003

(65) Prior Publication Data

US 2004/0258846 A1 Dec. 23, 2004

(51) Int. Cl.
C23C 14/00 (2006.01)

(52) U.S. Cl. .............. 118/50; 15/302; 15/319

(58) Field of Classification Search .......... 15/302, 15/301, 319, 320, 322; 118/50, 411, 704, 118/719, 412
See application file for complete search history.

(56) References Cited

U.S. PATENT DOCUMENTS

| | | | | |
|---|---|---|---|---|
| 3,705,437 A | * | 12/1972 | Rukavina et al. ............ | 15/302 |
| 3,747,155 A | * | 7/1973 | Koellisch ...................... | 15/322 |
| 3,958,298 A | * | 5/1976 | Cannan ......................... | 15/322 |
| 4,457,042 A | * | 7/1984 | Jones et al. .................... | 15/322 |
| 4,720,889 A | * | 1/1988 | Grave ........................... | 15/322 |
| 4,756,048 A | * | 7/1988 | Kauffeldt et al. ............. | 15/320 |
| 5,349,722 A | * | 9/1994 | Chayer ......................... | 15/353 |
| 6,269,517 B1 | * | 8/2001 | Dornier ......................... | 15/322 |
| 6,370,728 B1 | * | 4/2002 | Burns ........................... | 15/320 |
| 6,725,497 B1 | * | 4/2004 | Konrad ......................... | 15/302 |

* cited by examiner

Primary Examiner—Brenda A. Lamb
(74) Attorney, Agent, or Firm—Paul Bogdon (57) ABSTRACT

Apparatus and method for treating by injecting a fluid treatment material into porous structures such as those formed from concrete, brick, stone, marble, and wood. The apparatus includes an applicator head having an inner chamber and an outer chamber surrounding the inner chamber both of which chambers are connected with a vacuum source. The inner chamber is also connected with a source of pressurized liquid treatment material. The method is for treating such porous structures and includes the steps of engaging the structures with the applicator head, drawing a vacuum on at least the outer chamber to secure the applicator head to the structure, and supplying the pressurized liquid treatment material to the inner chamber to impregnate the structure to be treated.

11 Claims, 5 Drawing Sheets

APPARATUS AND METHOD FOR TREATING AND IMPREGNATING POROUS STRUCTURES

BACKGROUND OF THE INVENTION

1. Field of the Invention

This invention relates to apparatus and method for treating by injecting a fluid treatment material into porous structures such as those formed from concrete, brick, stone, marble and wood including those structures with metal reinforcement members or other members embedded therein.

2. Description of the Prior Art

Buildings, roads, bridges, tunnels, airport runways, marine supports, monuments, sculptures, art works, and various other man made outdoor structures are formed of concrete, masonry, brick, stone, marble or wood all of which are porous in varying degrees. Many of these structures have metal, such as steel, reinforcement members or other members embedded therein. These outdoor structures are exposed to the environment including water and its various hazards from such atmospheric pollutants and conditions such as acid rain, salt, extremes of temperature and other airborne and water pollutants. Reinforcing steel members embedded in the porous structures increase deterioration created by the corrosion and oxidation of the steel following erosion of the surrounding material caused by the pollutants in the atmosphere and water. The pollutants, acid in character, penetrate and react with the salts present in the material resulting in slow and persistent erosion, cracking, crumbling, spaulling, and eventual failure of the exposed porous structures.

As carefully described in U.S. Pat. Nos. 5,413,808 and 5,565,032 and other U.S. Patents issued in the name of Jay S. Wyner, and repeated herein, the heretofore methods of treating and preserving porous structures of the nature referred to above, have provided only short term and often times inadequate protection. Preservative materials applied by brush, spray, roll-on, and even pressure injection methods, achieve only shallow penetration by capillary action. A single coating of the preservative material proved insufficient with a second coating tending to clog the porous structure's breathing passages according to the National Bureau of Standards Report No. 1118. With the surfaces of the porous structures clogged, internal stresses and pressures develop within, created by the effect of thermal changes on the ever-present moisture in masonry. As a result, the trapped vapor pressure generated thereby breaks through, cracks, delaminates, and destroys the protective coating.

Other methods have been used in attempts to preserve porous structures of concrete or masonry. The structure is opened, rusted reinforcing members are cleaned, the structure repainted, the reinforcing members replaced where needed, and the outer structure then repaired. In another method, holes are drilled in the structures containing reinforcing steel members, a preservative material applied under manual or pump pressure, the holes refilled and the masonry repaired. Yet another method used on roadbeds and such like structures involve cutting elongated slots or grooves, filling the slots or grooves with coating material. These preservation methods are slow, tedious, costly, and often times somewhat ineffective.

As to wood preservation, paint, shellac, epoxies, or urethanes are applied to the surfaces resulting in protection which lasts a few seasons before the need arises to scrape and sand the old protective surface and repeat the coating applications. Damage often results to the original coating from the shallow penetration and sealing effect of applications made by brush, roll-on or spray. The cellular resin structure of wood tends to cause a chemical migration in the wood when thermal expansion stresses, such as hot and cold weather conditions, are imposed. During the warm weather times, the expansion stresses cause the coatings to expand as a result of the forces imposed by the wood's cellular resins. At colder weather conditions, the contraction stresses cause the coatings to crack and peel, allowing moisture, acid rain and pollutant intrusion to cause the coatings to lift off the structures when freeze-thaw cycles occur. Moisture and pollutant absorption into the wood fibers accelerates decay.

Various concrete structures are formed in marine or water environments such as piers, sea walls, tunnels, bridge supports, and various others. In order to treat such water surrounded structures, enclosures or dikes are formed around the structure, the surrounding water pumped out, and the treating processes followed. Certain of those processes described hereinabove have been used. Extreme care is required to insure separation of the water from the structure in following the time consuming method used for treating water bound structures.

The presently used methods of preservation and treating porous structures are inadequate in providing deep impregnation of treating liquids into the structure. Additionally, the methods and treating apparatus cannot be used effectively on all structures. Typically, brushing, rolling, spraying, or pressure injecting treating liquid on vertical structures is seriously ineffective since those methods rely on gravity and capillary action to move the liquids into the structure. Although concentrated pressure injecting of treating liquids into a structure or substrate results in some degree of impregnating, the methods used are limited in that they are useable with structure such as construction lumber, utility poles, and certain portable concrete structures where the various structures are placed in a fixed tank and subjected to pressurized treating liquids. These pressure systems are not useable on outdoor structures of the kinds already mentioned. Apparatus for injecting preservative liquids into porous structures are limited to use on flat, horizontally oriented structures such as floors, roads, walkways, tunnel and bridge surfaces, runways, and such like. Spraying treatment material also results in the bouncing of the liquid as it hits the surface of the structure resulting in unnecessary waste of the treatment material. It has been found that spraying on outdoor structures does not result in deep penetration of the treatment material into the structures. Aside from not being useable on upright or vertical oriented structures, the known injection apparatus is not useable under water or on ceilings.

The present invention overcomes the problems inherent in existing methods and apparatus for treating outdoor porous structures, by providing an apparatus and method for treating and deep impregnation of such porous structures and which apparatus and method are useable on upright structures, ceilings, under water as well as on standard horizontally oriented structures. The apparatus and method of this invention are also readily useable on structures of virtually any shape or form, such as on cylindrical, fluted, artistically formed, layered structures or statues and monuments, for example. The apparatus of this invention which applies the inventive method, is simple in construction and relatively inexpensive to produce while achieving the results of deep penetration and impregnation of fluid treatment material into porous structure of virtually any configurations and orientation including walls and ceilings in the atmosphere or under water.

SUMMARY OF THE INVENTION

The present invention provides apparatus and method for preservation and treatment of porous structures such as those formed from concrete, brick, stone, marble, and wood including those structures above and below ground and in water and those structures having embedded therein metal reinforcement members or other members. The apparatus and method of this invention effect the treatment and preservation of porous structures without the need for breaking open, destroying, repairing, or replacing any part of the structure. Additionally, the present invention, both the apparatus and method, is effectively useable on upright structures, ceilings, structures under water, monuments, sculptures, and other solid art works.

The method of the present invention is for treating by injecting a fluid treatment material such as a liquid preservative into a porous structure such as those formed from masonry, concrete, brick, stone, marble, and wood including those structures having reinforcement members or other members embedded therein, whether those structures are situated in the atmosphere or under water. Typical of the structures treatable by the method of the invention would be sidewalks, airport runways, parking garages, building walls and ceilings, bridge decks, bridge piers, tunnels, roof decks, balconies, monuments, statues, sea walls, containment dikes, foundations and such like. The method of this invention in its preferred form includes the steps of engaging in sealed relationship to a porous structure to be treated an applicator head having defined therein at least one first chamber and at least one second chamber surrounding the first chamber, the chambers sealed from each other, with the chambers communicating with the structure to be treated; drawing a vacuum on each of the chambers to secure the applicator head to the structure; withdrawing the vacuum from the first chamber; supplying a pressurized fluid treatment material such as a liquid preservative to the first chamber and the structure to be treated until the structure is impregnated with the preservative material to a desired depth; and while supplying the treatment material maintaining the drawing vacuum on the second chamber and supplying the preservative material to the first chamber to keep the applicator head in sealed engagement with the structure. Securing the applicator head in place on the structure with the applicator head sealed from the surrounding environment permits the treating of any structure whether it is located in the atmosphere or under water, or whether it is upright, such as a vertical wall, a ceiling, or a typical horizontal structure, such as a runway, walkway, bridge deck, and such like. The pressurized treatment material is applied after vacuum is removed from the first chamber and is applied in a contained setting avoiding splattering or bouncing of the material from the surface of the structure, or its running down from upright structures. The removal of the vacuum and applying pressurized treatment material allows for deeper penetration of the treatment material into the porous structures. The containing and focusing of the pressurized preservative on the structure results in rapid, effective impregnation of the structure with virtually no waste of the material.

The apparatus of the present invention for practicing the inventive method of treating by injecting a fluid treatment material into porous structures formed from masonry, concrete, brick, stone, marble, and wood, including those structures with reinforcement members embedded therein, comprises, in its preferred form, an applicator head constructed to engage at least a surface section of a porous structure to be treated; the applicator head defining at least one first chamber having an outer peripheral border engageable with a surface portion of a structure to be treated, and at least one second chamber surrounding said first chamber and having a peripheral border engageable with the surface portion of a structure to be treated; vacuum producing means, such as a venturi pump, communicating with at least the second chamber for drawing a vacuum in the chamber when the applicator head is in engagement with the porous structure to be treated to positively secure the applicator head to the structure; first sealing means communicating with the peripheral border of the first chamber for effecting a seal between the first chamber and a porous structure to be treated and between the first chamber and the second chamber when the applicator head engages the structure to be treated; second sealing means communicating with the peripheral border of the second chamber for effecting a seal between the second chamber and the structure to be treated; fluid treatment material means, such as a contained vessel and a positive discharge pump, communicating with the first chamber for selectively applying pressurized treatment material to the porous structure to be treated; and control means for selectively controlling the functioning of the vacuum producing means and the liquid preservative material means. The applicator head, the first and second sealing means, the liquid preservative material means and the control means being constructed and arranged such that when the applicator head engages a porous structure to be treated and a vacuum is drawn on the second chamber the applicator head is positively secured to the structure and sealed from the surrounding environment, and fluids in and on the porous structure tend to be drawn therefrom and discharged from the applicator head, and when pressurized material is supplied to the first chamber the porous structure engaged by the applicator head is impregnated with preservative material. A portable carriage may be used to support the vacuum producing means, the fluid treatment means, the means being typically a venturi pump, and a storage vessel and pump, respectively, and the control means. The applicator head would communicate with the vacuum and liquid preservative means by suitable hoses or tubing. Since the applicator head is positively secured to the structure to be treated and its interior effectively sealed from the surrounding environment, be it the atmosphere or water, the apparatus is useable on ceiling structures, upright structures, such as vertical walls, on land or in bodies of water. The applicator head may be shaped to conform to differing shapes of porous structures to be treated.

The basic method of treating porous structures of the present invention is simple, easy to understand, easily controlled, and rapid in operation. The basic structure of the apparatus of this invention is simple in construction, comprised of few elements, relatively inexpensive to produce utilizing standard components, and uncomplicated and efficient in its use. This apparatus is modifiable in various ways, for example in the types of pumps, containment vessels, and control arrangement, as well as differing shapes and sizes of applicator heads.

Various other advantages, details, and modifications of the present invention will become apparent and indicated as the following descriptions of a certain preferred embodiment and certain present preferred method of practicing the invention proceed.

BRIEF DESCRIPTION OF THE DRAWINGS

In the accompanying drawing we show a certain present preferred embodiment of our invention in which.

DESCRIPTION OF A PREFERRED EMBODIMENT AND METHOD

Figure 2:
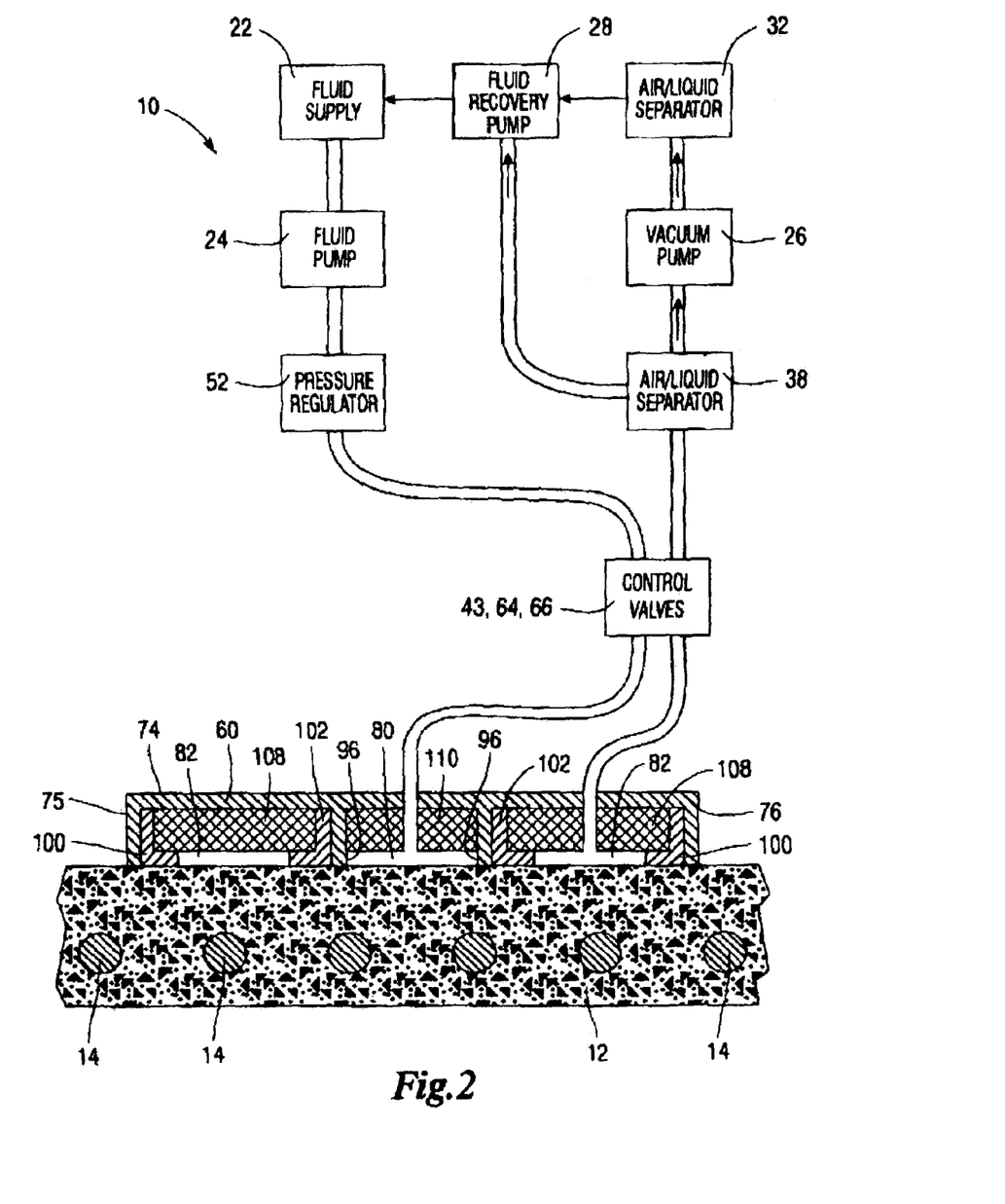
FIG. 2 is a side elevational sectional view of the applicator head of the apparatus of the present invention in engagement with a structure to be treated and diagrammatic representation of various parts of the apparatus in their relationship to the applicator head.
Figure 6:
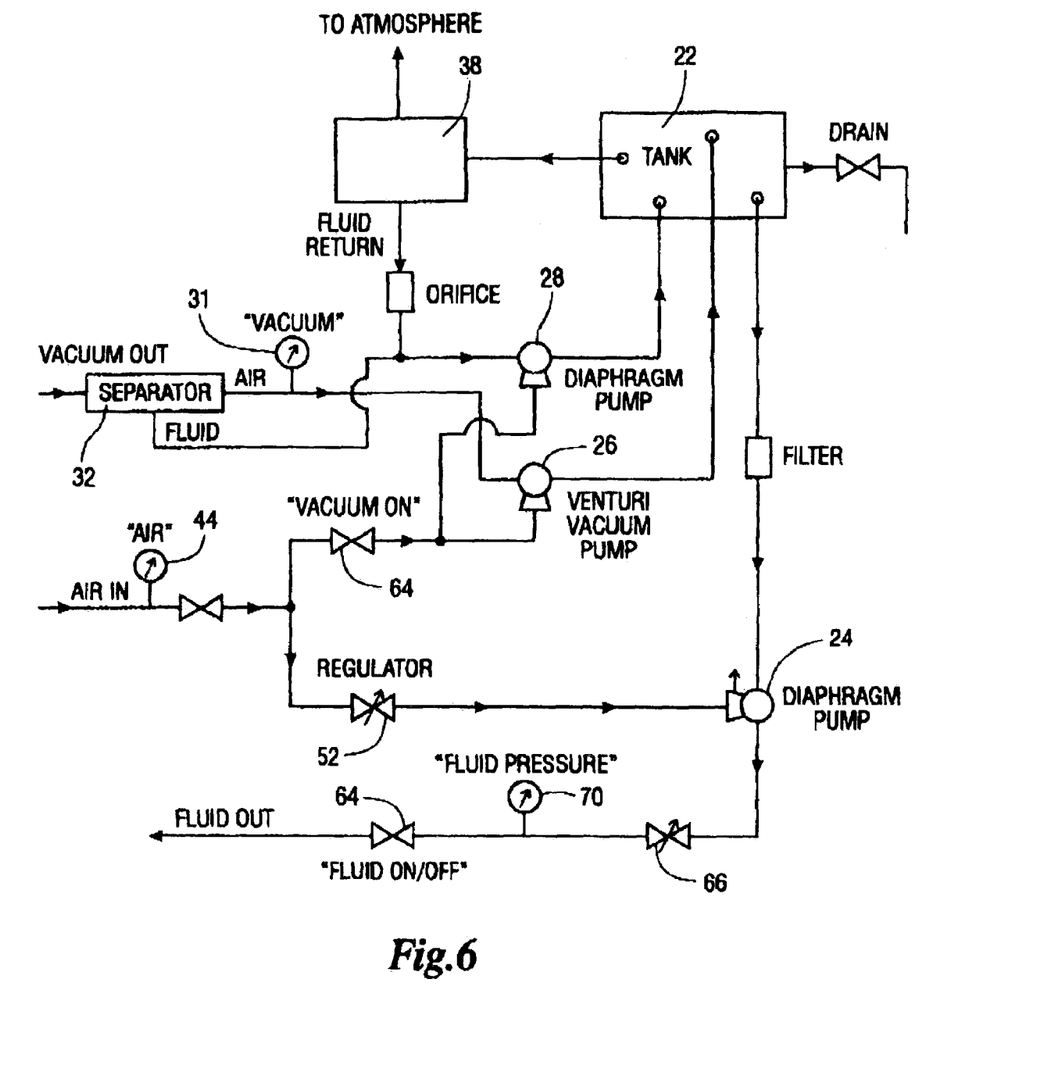
FIG. 6 is a part diagramatic and part schematic of the various parts and hydraulic circuitry, respectively, of the apparatus of the present invention.

Referring now to the drawing there is shown an apparatus 10 for treating a porous structure formed from concrete, masonry, brick, stone, marble, or wood including those structures with reinforcement members or other members embedded therein. Typical of such porous structures are building parts, roads, bridges, airport runways, marine supports, monuments, sculptures, art works, and various other man made outdoor structures. The apparatus and method of the present invention are useable to treat structures in the atmosphere or under water, and structures which are upright, such as walls and ceilings. FIG. 2 shows a section of a porous concrete structure 12 which could be typically a building floor, roadbed, walkway, or an airport runway, having embedded therein steel reinforcing rods 14. The apparatus 10 would be used for treating the porous structure 12, apparatus 10, as shown in the various figures, includes a portable frame or carriage 16 which may be moved from place to place by manually pushing or pulling, the carriage 16 mounted on wheels 18 and 20. Supported by the carriage 16 is a typically cylindrically shaped, close ended fluid supply storage tank 22 operatively connected by suitable tubing 23 to a standard liquid pump 24, typically any well known air operated diaphragm pump. Any suitable liquid preservative or treatment material would be stored in storage tank 22 which is also operatively connected by suitable tubing 25 to a vacuum pump 26, typically any well known operated venturi type vacuum pumps. Storage tank 22 is also operatively connected by suitable tubing 27 to a liquid recovery pump 28 which, as will be clearly understood as this description continues, serves to return the storage tank 22 any unused treatment material from the surface of a structure to be treated. Liquid recovery pump 28 would be any well known air operated diaphragm pump. Vacuum pump 26 is connected by suitable tubing 30 to a vacuum gauge 31 and a liquid/air separator 32 which in turn is connected by tubing 33 to liquid recovery pump 28. The interconnection of the elements described above and to be described are shown schematically and diagramatically in FIG. 6.

Storage tank 22 and liquid recovery pump 28 are connected by tubing 34 and 36 respectively to a liquid/air separator 38 which would separate any air from the tank 22 and/or from any unused treatment liquid from the structure treated. The liquid/air separator is vented to the atmosphere for discharging the separated air.

Inlet air from the atmosphere is directed through a compressor, not shown, to the vacuum pump 26 by suitable tubing 42, through a manually operated main air on/off valve 43, the air pressure being registered on an air inlet pressure gauge 44 connected with tubing 46. The inlet air entering the system through tubing 42 would preferable be at about 120 psi.

Liquid pump 24 is operatively connected with compressed atmospheric air by suitable tubing 50 connected with tubing 42. Tubing 50 is connected to an air pressure regulator 52 which in turn is connected to the inlet of liquid pump 24. Liquid recovery pump 28 is operatively connected with atmospheric air by suitable tubing 54 interconnected with tubing 50 which as described is connected with tubing 42 through which atmospheric air would flow.

An applicator head 60 is operatively connected with the liquid treatment material stored in storage tank 22 by suitable tubing 62 which is connected with an on/off valve 64 which in turn is connected with a liquid pressure regulator 66 connected in turn with the outlet of liquid pump 24 by suitable tubing 68. A fluid pressure gauge 70 for reading the outlet pressure of the liquid pump 24 communicates with tubing 68. Applicator head 60 is also operatively connected with the vacuum pump 26 through the liquid/air separator 32 by suitable tubing 72.

Figure 5:
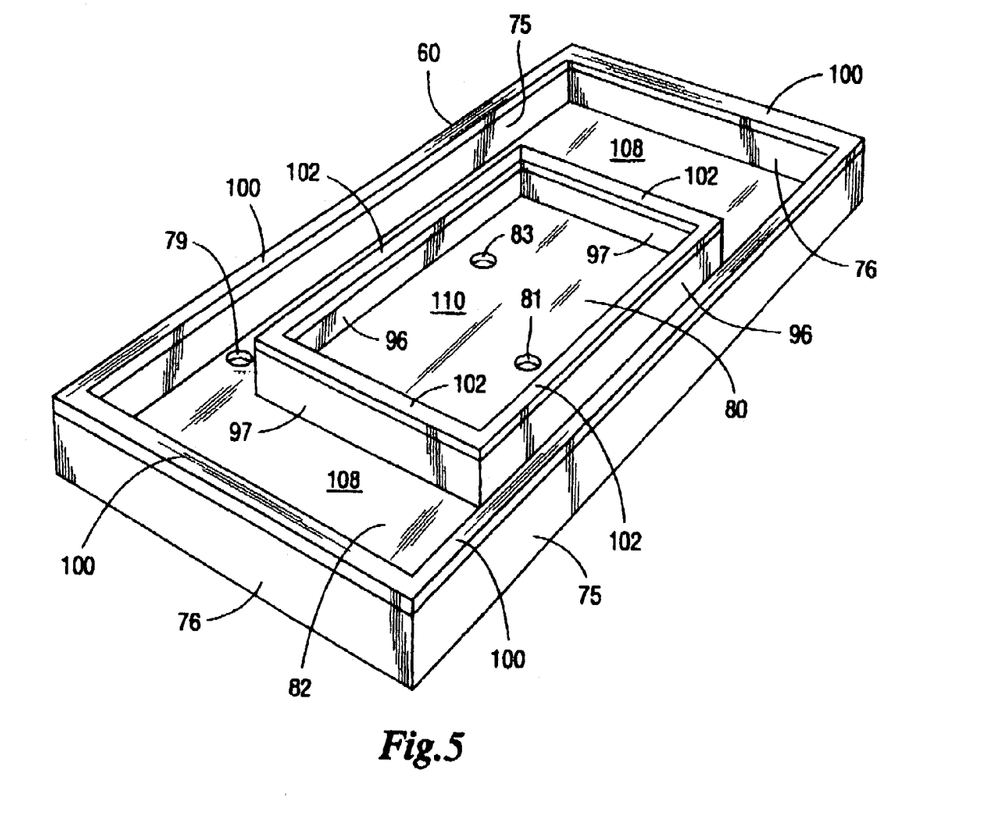
FIG. 5 is a perspective view of the applicator head of the apparatus of the present invention looking at its underside to show the detail for construction of the inner and outer chambers thereof and the seal members on the peripheral borders of the chamber.

Applicator head 60 as shown in this embodiment of the invention is generally rectangular in shape having a flat upper section 74 and shallow longitudinal side walls 75 and lateral end walls 76. As shown in the bottom view of FIG. 5, there is defined within the confines of applicator head 60 inner compartment 80. FIG. 5 shows an opening 79 which extends through the upper section 74 of the applicator head 60 into the outer compartment 82. Pressurized liquid treatment material is directed to the inner compartment 80 through tubing 62 connected with manually operated valve 85 and then through tubing 86 by a T-connection through opening 88. Tubing 86 is also connected with a manually operated vent valve 88 which would be opened as desired to vent the inner compartment 80 to the atmosphere. Vacuum is drawn on both the inner compartment 80 and outer compartment 82 through tubing 72 connected, as described, to vacuum pump 26. Tubing 72 is connected with a manually operated vacuum valve 90 which in turn is connected by tubing 92 through a T-connection as shown to opening 79 of the outer compartment 82. Tubing 92 is also connected with a manually operated vacuum valve 93 which in turn is connected with tubing 94 connected with opening 83 of the inner compartment of the applicator head 60.

Figure 1:
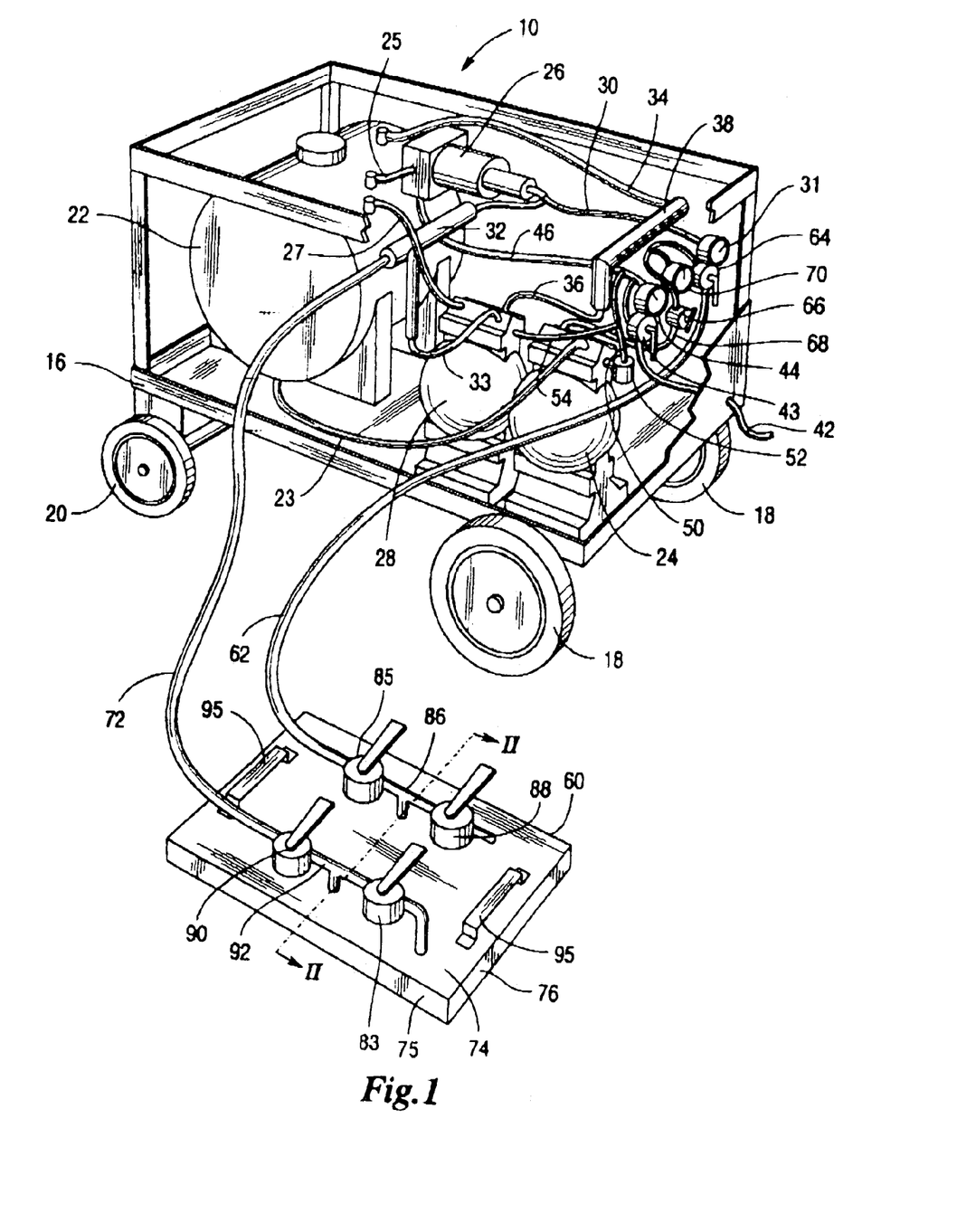
FIG. 1 is a perspective view of the apparatus for treating a porous structure of the present invention, with parts cut away to show details of construction.

As shown in FIG. 1, handles 95 are fixed to opposite end sections of the upper section 74 of the application head 60 for being grasped by a user to position the applicator head 60 on the surface of a structure to be treated such as the structure 12 shown in FIG. 2 and/or to hold the applicator head 60 in place until vacuum attachment is achieved, as will be more fully described hereinafter. FIG. 2 also shows, diagramatically in part, the interaction of the elements above described with the applicator head 60 in place on structure 12.

Figure 3:
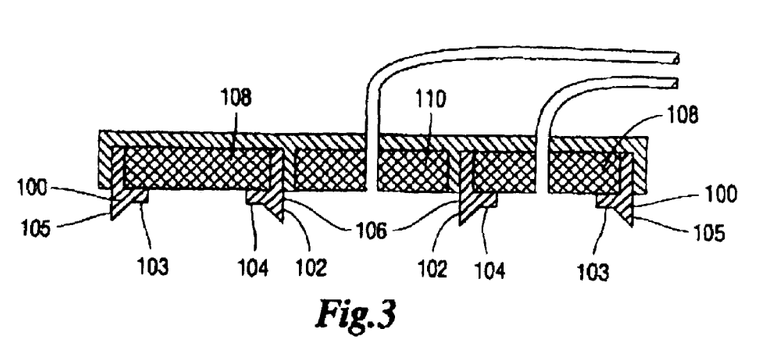
FIG. 3 is a side elevational sectional view looking through line II—II of FIG. 1 of the applicator head of the apparatus of the present invention shown in its free state illustrating the seal members in their extended form.
Figures 4A, 4B, 4C:
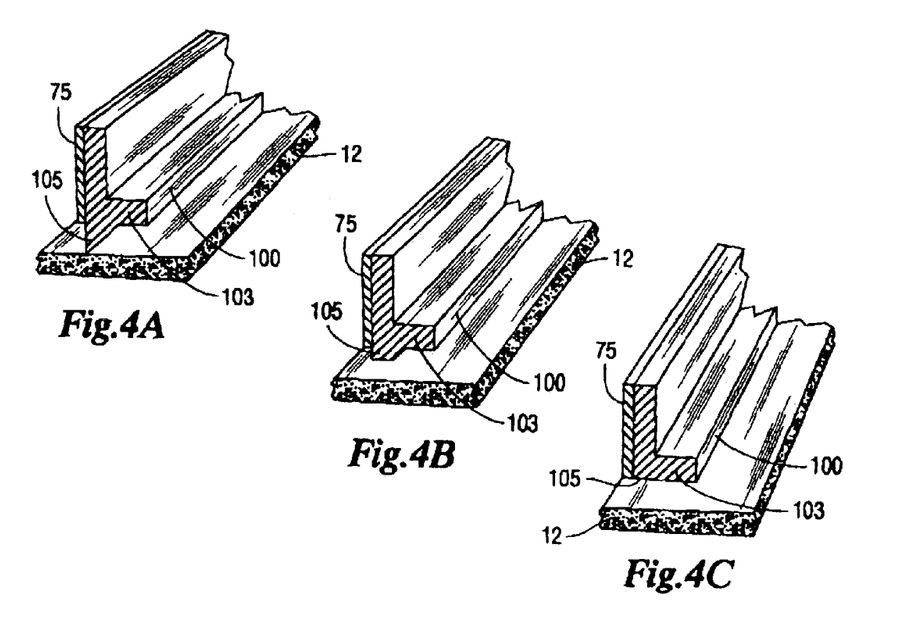
FIG. 4 is an enlarged sectional and perspective view of a part of one of the seal members showing details of construction.

As clearly shown in FIG. 5, the outer compartment 82 of applicator head 60 has a peripheral border formed by the interconnected side walls 75 and end walls 76. Extending downwardly the same dimension from the upper surface 74 of the same applicator head, the inner compartment 80 of applicator head 60 has a peripheral border formed by side walls 96 and 97, each having a depth dimension substantially the same as the depth of dimension of side and end walls 75 and 76. As clearly shown in FIGS. 2–4 downwardly extending seals 100 are fixed on the outer peripheral border of the outer compartment 82, that is, on walls 75 and 76. Similarly, a downwardly extending seal 102 is fixed on the peripheral border of the inner compartment 80, that is, on the side walls 96 and 97. As shown in FIGS. 3 and 4, the seals 100 and 102 have an inner part 103 and 104, respectively, formed of a resilient low density closed cell foam material, and an outer parts 105 and 106, respectively, also formed from the same resilient low density closed cell foam material. The compound seal 100 effects a positive seal between the outer compartment 82 and the surrounding environment, atmosphere water, when the applicator head 60 is in place and engaging a structure to be treated, and vacuum is drawn on the same outer compartment. Similarly, when the applicator head 60 is in place and engaging a structure to be treated, the composite seal 102 effects a positive seal between the inner compartment 80 and the outer compartment 82. A resilient high density foam sealing blanket 108 is fixed to the inner side upper section 74 of the applicator head 60 and blankets the entirety of outer compartment 82. Similarly, a blanket 110 of high density foam material is fixed on the inner side of upper section 74 of the applicator head 60 and blankets the entirety of the inner compartment 80. The opening 81, 83 and 79 of the inner and outer compartment respectively, extend through the sealing blankets 108 and 110, respectively. The sealing blankets 108 and 110 would serve to squeeze any liquids in the surface of the structure to be treated so that the liquid would tend to flow to the opening 81, 83, and 85, of the inner and outer compartments 80 and 82, respectively. This squeezing action of blanket 110 is significant when the applicator head 60 is placed on a horizontal surface such as a walkway, floor, or such like where the blanket would be compressed under the pressure of the treatment material and would expand toward engaging the surface of the treated structure to thereby urge any excess treatment liquid to the opening 83 and ultimately to the storage tank 22.

In its operation the apparatus 10 of the invention is initially positioned so that the applicator head 60 is engageable with a structure to be treated. The applicator head 60 is held on a surface portion of the structure and the main air valve 44 opened to admit atmospheric air through the pressure regulator 52 to pump 24 which will pump liquid treatment material from the storage tank 22 to the liquid valve 85 which is in the off position. Air will also be directed to the valve 64, it in turn put into the on position to direct air to vacuum pump 26 which will draw a vacuum to valve 90 which will then be opened as will valve 93 to draw a vacuum in the inner compartment 80 and outer compartment 82 of the applicator head 60. The vacuum in the inner and outer compartments 80 and 82, and on the structure engaged by the applicator head 60 will tend to draw any air and liquids on or in the porous structure being treated, such air and liquid flowing through tubing 72 into the liquid/air separator 32 and into the liquid recovery pump 28 which would be operating and from there into the liquid/air separator 38 through the storage tank 22 and into the air vented through the liquid/air separator to the atmosphere and any liquid would be directed into the tank 22. When the preselected and desired vacuum is drawn on the treated structure the applicator head 60 will be drawn onto and positively fixed to the structure and sealed from the structure. Also, the inner compartment 80 will be positively sealed from the outer compartment 82. At that point, the valve 93 will be closed, valve 85 opened to direct pressurized treating liquid to the inner compartment 80 and onto and into the structure to be treated. The outer compartment 82 remains under vacuum to provide a restraining force to keep the applicator head 60 on the treated structure. After the treated structure is impregnated with the treating material, valve 85 is closed shutting the flow of pressurized liquid to inner compartment 80, and valve 85 opened to draw vacuum on the inner compartment 80 and to remove any remaining treating liquid on the surface of the treated structure, the remaining liquid being directed to the storage tank 22 through the liquid recovery pump 28. The vent valve 88 may now be opened to vent the outer compartment 82 to the atmosphere. The main air valve 43 would then be shut, the vacuum pump 26, liquid pump 24, and liquid recovery pump 28 would stop operating, at which point the applicator head 60 would be removed from the treated surface and the operation of the apparatus 10 repeated as desired.

The operation of the apparatus 10 of this invention represents the inventive method of the invention in that treating porous structures would apply the steps of engaging in sealed relationship a porous structure an applicator head 60 having defined therein at least one first chamber or compartment 80 and at least one second chamber or compartment 82 surrounding the first chamber, the chambers or compartments being sealed from each other and the structure to be treated, with the chambers or compartments communicating with the structure to be treated; drawing a vacuum on at least the second chamber or compartment 82 to secure the applicator head 60 to the structure to be treated; supplying pressurized fluid such as a liquid treatment material to the first chamber or compartment 80; and maintaining the vacuum pressure and fluid pressure in the second and first chambers or compartments 80 and 82, respectively, to keep the applicator head 60 in sealed engagement with the structure to be treated.

Typical vacuum pressure to be applied in the treating process would be between 25 and 27 mmHg with the pressure of the treating fluid being between 10 and 15 lbs./sq. in. and not at a magnitude which will overcome the vacuum pressure and lift the applicator head 60 from the structure to be treated. The time for applying the pressurized fluid to the first compartment 80 and the structure to be treated would typically be between 15 and 20 seconds after any vacuum drawn on the first compartment 80 was ceased, the time for applying the pressurized fluid would depend on the depths of impregnation desired.

In using the apparatus 10 of the invention it might also be necessary to fill any cracks in the surface area of the structure to be treated to close any possible channels open to the second compartment 82 which channels would prevent the desired vacuum to be drawn on the second compartment and prevent the development of the holding force for securing the applicator head 60 to the treated structure.

Several applications of this invention have resulted in positive treatment results. In one application the applicator head 60 was formed of ⅛ inch thick steel plate having overall dimensions of 18×40 inches. The inner compartment 80 had dimensions of 6×34 inches. Both compartments were provided with flexible foam rubber seals. The inner compartment had an area of 204 sq. inches and the outer compartment had an area of 516 sq. inches. Valves were secured to two one inch openings to the inner compartment 80 and to a one inch opening into the outer compartment 82. As earlier described liquid pumps and a vacuum venturi pump were operatively connected to the compartments. The applicator head 60 was positioned on a flat vertical reinforced concrete surface of a pile cap supporting a wharf deck. A vacuum of minus 14 psi was generated and drawn on the compartments. The applicator head 60 was held securely on the vertical surface. The vacuum was initially applied for about one minute removing the water and air entrained in the concrete. The vacuum was shut off from the inner compartment 80 and a liquid corrosion inhibitor was injected under a pressure of about 20 psi and held for about three minutes. During this time several gallons of inhibitor was injected into the concrete. The liquid valve to the inner compartment was shut off and the vacuum valve opened resulting in the excess inhibitor flowing back to the storage tank. The system was shut down and the applicator head removed. Prior to the injection of the inhibitor which was the TPS II corrosion inhibitor of Surtreat International, the corrosion rate of the reinforcement members in the pile cap at a depth of 5 inches was measured at 500 um/Yr. using a gavalanostic polarization device called a Galvapuls. After the treatment as described and twenty-four hours later the corrosion rate was measured at 20 um/Yr. demonstrating that the vacuum pressure injection of the inhibitor was to a depth of five inches in about three minutes.

In another application of the present invention, a rectangular applicator head 60 was used formed of a 1/16 inch thick steel plate having outer dimensions of 24×36×1/2 inches. The outer perimeter or periphery of the applicator head 60 was provided with a 2×1 inch flexible closed cell foam rubber seal. The inner compartment 80 had dimensions of 12×24 inches with the same dimensions of flexible closed cell foam rubber seals provided on its periphery. The outer compartment had an area of 528 sq. inches and the inner compartment an area of 336 sq. inches. Openings of one inch in diameter were formed to communicate with the inner and outer compartments. A venturi vacuum pump and liquid pump communicated with the liquid storage tank and the compartments, as described earlier. The applicator head was placed on a flat reinforced concrete surface of a condominium building balcony. Compressed air at 100 psi and at 30 cfm was passed through the venturi vacuum pump and generated a vacuum of minus 22 mmHg. This negative pressure securely fixed the applicator head to the surface of the balcony. The vacuum was held for about one minute to evacuate entrained air from the concrete structure. A liquid corrosion inhibitor made by Surtreat International known as TPII was directed at 22 psi to the inner compartment by a liquid pressure pump and held for about three minutes. The liquid pressure was released and the inner chamber cycled to vacuum to remove excess inhibitor to the storage tank. The system was shut down and the applicator head removed. Prior to the injection of the corrosion inhibitor the corrosion rate of the reinforcing bar at a depth of two inches was measured at above 500 um/Yr. using a gavalanostic polarization device called Galvapuls. Thirty days after inhibitor injection the corrosion rate of the same rebar was measured below 20 um/Yr. Fifteen days after the inhibitor injection the compressive strength of the structure was re-measured at an increase of 390 psi for a total compressive strength of 6560 psi.

In yet another application of the apparatus and method of the invention, a rectangular enclosure consisting of 040 plastic PVC having dimensions of 2×4×1 inches was used. The outer perimeter or periphery of this applicator head was provided with a 1/3×1/3 inches of flexible closed cell foam rubber sealing material. The periphery of the inner compartment had dimension of 1×2 1/2 inches and was provided with the same 1/3×1/3 inches of flexible closed cell foam rubber seal material. Openings of 1/4 in. diameter were made to the inner and outer compartments. A valve was attached to the outer compartment and connected with a vacuum generating device and a liquid separating device. The inner compartment communicated with a storage tank through a liquid pressure pump. The applicator head was placed on the top of a 2×4×1/2 inches sand cast brick approximately one hundred years old. The vacuum device generated a vacuum of minus 14 mmHg which was sufficient to hold the applicator head in place on the sand cast brick. The vacuum was held on both compartments for about one minute to evacuate entrained air from the sand cast brick. A liquid corrosion inhibitor of Surtreat International known as TPS II was applied at a positive pressure of 8 psi by a liquid pressure pump for about five minutes. The liquid zone pressure was released and the excess liquid in the inner compartment allowed to flow back to the storage tank. The system was shut off and the applicator head removed. Prior to the injection of the corrosion inhibitor the sand cast brick was severely damaged and powdered on handling. This brick was delaminating into five separate layers on the longitudinal axis. One day after injecting the corrosion inhibitor the strength and hardness of the sand cast brick was sealed eliminating the delimitation creating a solid structure.

Various other examples of the application of the apparatus and method of the invention may be provided with the positive results to the structures typical of what has been indicated hereinabove.

Various modifications of the invention are possible. The applicator head 60 may be formed in any configuration for use with varying shapes of porous structures. For example, the applicator head 60 could be formed as a cylindrical section to fit onto a cylindrical structure. The seals could be shaped and formed to engage variously shaped structures as well. The apparatus 10 could be adjusted for injecting gaseous or vaporized treatment materials into treated structures. For example, steam might be injected to thaw frozen structures. The applications of this apparatus and method of this invention are beyond strengthening structural bodies. The invention could be used in injecting insecticides through structures such as concrete patios, walkways, and floors, or wooden structures to kill termites. The invention could be used in injecting chemicals into plaster or or wall board walls and ceilings to kill molds and such like. Various other modifications and advantages of the apparatus of this invention for treating porous structures and the method of treating porous structures of this invention should be clearly understood by those skilled in this art.

It should now be clearly understood and apparent that the apparatus and method of this invention is effectively and efficiently useable in treating porous structures such as those formed from masonry, concrete, brick stone, marble, and/or wood including those structures having reinforcement members or other members embedded therein, whether those structures are horizontally oriented, including ceilings, or upright oriented such as walls, pilings, or such like, and whether the structures are in the atmosphere or under water.

While we have shown and described a present preferred embodiment of this invention and method of practicing the invention, it is to be distinctly understood that the invention is not limited thereto, but may be otherwise embodied and practiced within the scope of the following claims.

We claim:

1. Apparatus for treating by injecting a fluid treatment material into porous structures such as those formed from masonry, concrete, brick, stone, marble, and wood including those structures with reinforcement members or other members embedded therein, comprising:

applicator head means for engaging at least a surface section of a porous structure to be treated;

said head means defining at least one first chamber having an outer peripheral border engageable with a surface portion of a porous structure to be treated, and at least one second chamber surrounding said first chamber and having a peripheral border engageable with a surface portion of a porous structure to be treated;

vacuum producing means communicating with at least said second chamber for drawing a vacuum in said second chamber when said applicator head means is in engagement with a porous structure to be treated to positively secure said applicator head means to the structure;

first sealing means communicating with the peripheral border of said first chamber for effecting a seal between said first chamber and a porous structure to be treated and between said first chamber and said second chamber when said applicator head means engages a porous structure to be treated;

second sealing means communicating with the peripheral border of said second chamber for effecting a seal between said second chamber and a porous structure to be treated;

fluid treatment material means communicating with said first chamber for selectively applying pressurized fluid treatment material to a porous structure to be treated;

said fluid treatment material means including at least one supply reservoir;

control means for selectively controlling the functioning of said vacuum producing means and said fluid treatment material means;

pressure supply means for selectively increasing the pressure of the fluid treatment material; and said applicator means, said first and second sealing means, said fluid treatment material means, said pressure supply means and said control means being constructed and arranged such that when said applicator head means engages a porous structure to be treated and a vacuum is drawn on said second chamber said applicator head means is positively secured to the porous structure and sealed from the surrounding environment, fluids in and on the porous structure tend to be drawn therefrom and discharged from said applicator head means, and the fluid treatment material supplied to said first chamber impregnates the porous structure with the fluid treatment material.

2. Apparatus for treating as set forth in claim 1 wherein said vacuum producing means communicates with said first chamber.

3. Apparatus for treating as set forth in claim 1 wherein said fluid treatment material means is a liquid preservative material means.

4. Apparatus for treating as set forth in claim 1 wherein said head means defines a single first chamber generally centrally located on the structure of said head means; and wherein said head means defines a single second chamber surrounding the entire first chamber.

5. Apparatus for treating as set forth in claim 1 including portable carriage means supporting said fluid treatment material means, and said control means.

6. Apparatus for treating as set forth in claim 1 wherein said first and second chambers are shaped to conform to the exterior shape of the structure to be treated and with peripheral borders snugly engageable with the surface of the porous structure to be treated.

7. Apparatus for treating as set forth in claim 1 including regulating means for maintaining a desired predetermined vacuum in said second chamber.

8. Apparatus for treating as set forth in claim 1 wherein said first and second sealing means are constructed and arranged such that they will conform to any surface configurations of the porous structure to be treated.

9. Apparatus for treating as set forth in claim 1 wherein said first and second sealing means are constructed of a resilient closed cell foam material adapted to conform to any surface configuration of the porous structures to be treated.

10. Apparatus for treating as set forth in claim 9 wherein said first and second sealing means each have an inner part having a generally flat surface engaging upper face and a generally triangular cross section shaped outer part terminating in a generally pointed surface engaging upper end.

11. Apparatus for treating as set forth in claim 1 including a high density resilient means secured on the surface of at least said first chamber for compression when the fluid treatment material is applied to said first chamber and expanding when the fluid treatment is released from said first chamber with the surface of the porous structure to be treated.

* * * * *